Figure 1:
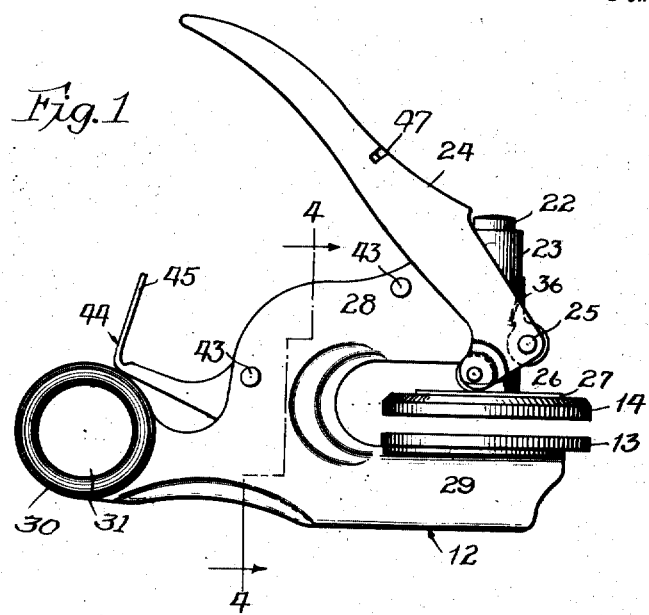

H. H. WENTHE.
IMPRESSION SEAL.
APPLICATION FILED AUG. 16, 1917.

1,253,756.

Patented Jan. 15, 1918.
2 SHEETS—SHEET 1.

Witness
Chas. R. Koursh.

Inventor.
Herman H. Wenthe.
By: [signature] Atty.

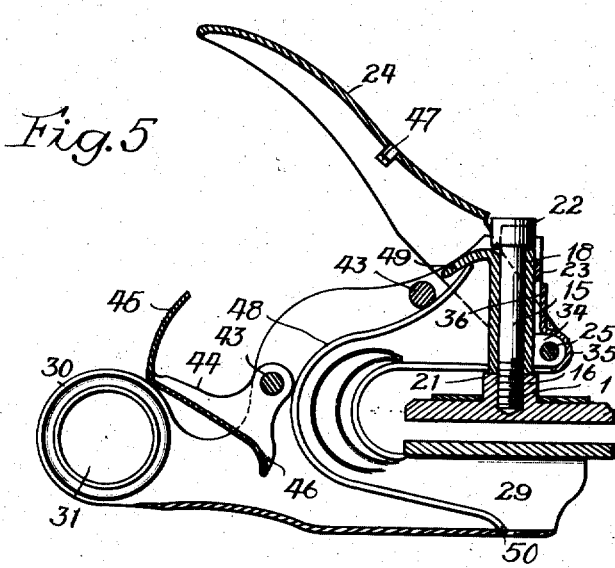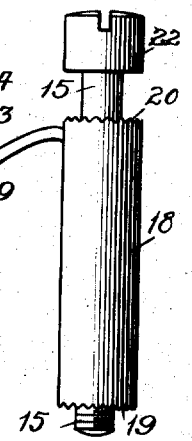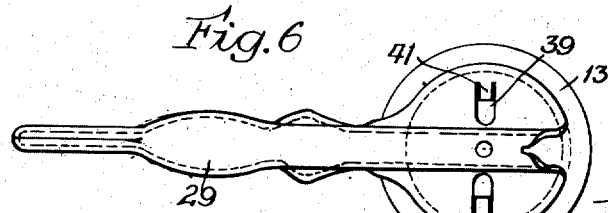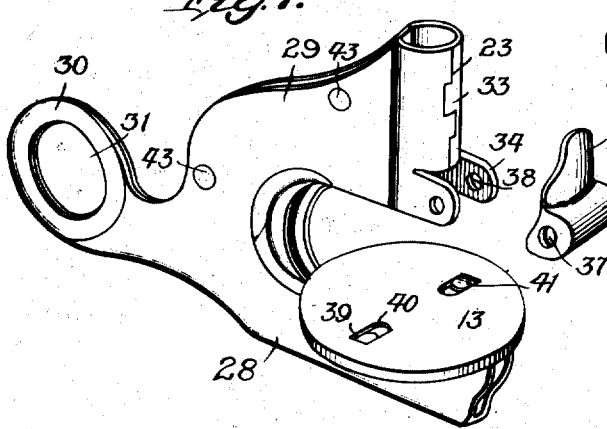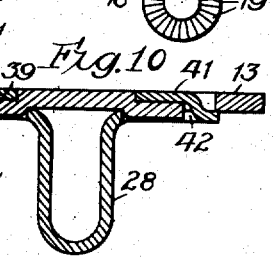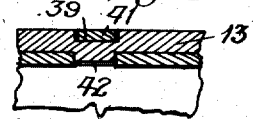

UNITED STATES PATENT OFFICE.

HERMAN H. WENTHE, OF CHICAGO, ILLINOIS.

IMPRESSION-SEAL.

1,253,756.  Specification of Letters Patent.  Patented Jan. 15, 1918.

Application filed August 16, 1917. Serial No. 186,515.

*To all whom it may concern:*

Be it known that I, HERMAN H. WENTHE, a citizen of the United States, residing at Chicago, in the county of Cook and State of Illinois, have invented certain new and useful Improvements in Impression-Seals, of which the following is a specification.

The present invention relates to an impression seal of the type used by notary publics, corporations, etc., for the purpose of embossing their official seal upon documents.

One of the objects of the present invention is to form a connection between the movable die and the stem or plunger which carries said die, so as to enable the die to be readily and quickly put in proper position in assembling the seal, and to provide means whereby the die is prevented from becoming disconnected from said plunger after the seal is assembled.

A further object of the invention is to provide a hook for holding the lever in down position, and to provide a finger-piece for readily and quickly unlatching said hook to allow the lever to rise.

A further object of the invention is to form the seal body by means of a die stamping operation and out of a single piece of metal, making it of hollow construction, thereby reducing materially the weight and cost.

A further object of the invention is to provide a leaf-spring extending within said body and adapted to normally hold the movable seal and plunger upward.

A further object of the invention is to form a strong and simple connection between the carrying plate for the fixed die member and the body.

The invention further consists in the features of construction and combination of parts hereinafter described and claimed.

Figure 2:
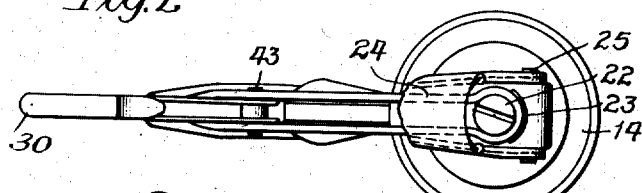
Figure 3:
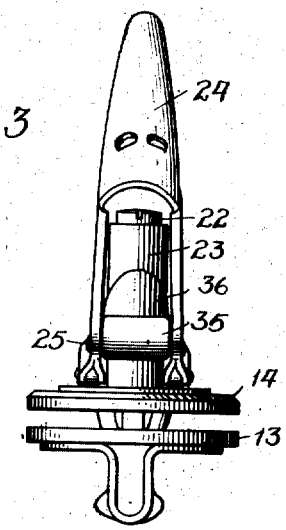
Figure 4:
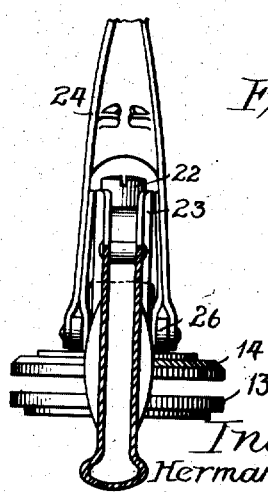

In the drawings:

Figure 1 is an elevation of a seal embodying the improvements of the present invention and with the lever member in raised position;

Fig. 2, a plan view of the parts shown in Fig. 1;

Fig. 3, a front elevation of said seal;

Fig. 4, a section on line 4—4 of Fig. 1, looking in the direction of the arrow;

Fig. 5, a vertical section through said seal;

Fig. 6, a bottom view, showing the connection between the seal body and the carrying plate for the fixed die;

Fig. 7, a perspective of the seal body, with the carrying plate for the fixed die in position;

Fig. 8, a detail, showing an elevation of the stem for holding the movable die and the sleeve surrounding said stem;

Fig. 9, a detail, showing a face view of the notched or serrated surface on the sleeve shown in Fig. 8;

Fig. 10, an enlarged section of the connection between the seal body and the carrying plate for the fixed die; and Fig. 11, a section on line 11—11 of Fig. 10.

In the art to which the present invention relates, there has been considerable difficulty experienced in properly positioning the lettering on the movable die so as to have it come in correct position when the seal is assembled. These dies have been formerly affixed to the plunger by means of a hole passing through the plunger, a registering hole in the die, and a cotter pin or some other suitable means passing through said holes and locking the die to the plunger. In forming the letters on the movable die, great care had to be taken to place the letters on the die in such position with respect to the hole through which the cotter pin passes as to bring them into proper and correct registration when the seal was assembled, since in order to assemble the movable die to the plunger, said die must be turned into one exact position, namely, where the holes in the die and plunger would aline. An illustration of this old method of assembling the die and plunger will be found in Patent No. 1,014,105 granted to me January 9, 1912, and entitled "Seal presses."

The bodies upon which the die-members are mounted have heretofore generally been made in the form of a casting, which was relatively heavy. Owing to the fact that these seals are frequently carried in the pocket of the user, it is evident that reduction in weight would be a material, practical advantage, and in the present invention this weight has been greatly reduced by forming the body of a die stamping instead of a casting.

Referring now to the drawings, and particularly to Fig. 1, the seal comprises a body given the general numeral 12. Carried by this body is a fixed die-member carrying plate 13, to which the fixed die may be suitably attached, and a movable die-member 14.

Referring to Figs. 5, 8 and 9, this movable die-member is carried by a stem 15, having a threaded end 16, which is inserted into a tapped opening 17 in the upper portion of the movable die-member. Surrounding this stem is a sleeve 18, having a serrated edge 19 on its lower face, and, as shown, a serrated edge 20 on its upper face. After the movable seal has had the letters or numbers formed thereon, it is turned to bring these letters in proper position with respect to the seal body. When such position has been ascertained, the stem 15 is turned, and moves downward by means of the threaded engagement with the movable seal. This downward movement of the stem draws the sleeve 18 downward until the serrated edge 19 is brought into a biting engagement with the top face of a neck 21 extending upward from the body of the movable seal. The lower face of the head 22 on the stem 15 is also brought into engagement with the serrated edge 20 on the upper portion of the sleeve 18, and a biting engagement is effected between this serrated edge and the lower face of the head 22. When the stem and sleeve are so positioned, due to the biting engagement above referred to, the movable seal is firmly secured to the plunger and cannot turn or otherwise get out of position with ordinary usage.

It is obvious that with this method of attachment, no particular care need be exercised by the die-maker in getting his letters arranged equally upon each side of a certain given point, since in assembling the seal, the movable die can be turned as desired to bring the lettering into proper position and the die then secured to the plunger. This eliminates the accurate placing of the lettering with respect to a given point on the seal, as was necessary in the prior art construction, and which has been previously explained.

The sleeve 18 extends through what may be termed a body sleeve 23. A lever 24 is provided, which is pivoted upon a pin 25, and at its lower end carries rollers 26 bearing upon the seal body. A depression of this lever causes the movable seal, stem 15 and sleeve 18 to travel downward for the purpose of bringing about a coöperation between the fixed and movable dies and make an impression on the paper. This lever action is also shown in my Patent No. 1,014,105 heretofore referred to.

As stated, one of the objects of the present invention is to form the seal body from a stamping, and this stamping produces a hollow construction, as will be apparent from the drawings, particularly Figs. 5 and 7.

The body comprises a lower portion 28, an upper overhanging portion 29 and a finger grip 30. The finger grip is of circular formation, with a circular opening 31 therethrough. The upper overhanging portion terminates in the body sleeve 23, which receives the sleeve 18; and the body sleeve 23 is locked together by means of tongue and groove connections 33.

Extending from the sleeve 23 are ears 34, over which is placed a member 35, which has a tongue 36 that is soldered or otherwise secured to the front of the sleeve 32. There are openings 37 provided in the member 35, adapted to aline with openings 38 in the ears 34; and through these alined openings passes the pin 25, upon which is pivoted the lever member 24.

In connecting to the seal body the carrying plate for the fixed die, I form a depressed portion 39 in the plate 13, and adjacent said depressed portion, I form a slot or opening 40 also in the plate. From the seal body are struck up tongues 41, and into the openings 42 produced by forming said tongues, the depressed portion of the seal body is placed. The tongues are inserted through the openings 40 in the seal body, and then bent downward and to overlie the depressed portion. This provides a rigid interlocking connection between the seal body and die, as will be better seen in Fig. 10. It also places the tongues 41 so that they do not project above the top of the plate, which would be objectionable, in that it would not allow the seal member to be properly placed on the plate.

To reinforce and strengthen the body, I insert cross pins 43, and to one of these cross pins is pivoted a latch 44, comprising a hook member 45 and a finger-piece 46. This hook member takes into lugs 47 formed from the lever member, and when engaged with said lugs, holds the lever member depressed. Owing to the hollow construction of the body, this latch member can be arranged to move in between the sections of the body, and the extension 46, which provides the finger-piece, lying between the sections of the body, is capable of free operation, enabling a quick and easy removal of the latch from engagement with the lugs 47.

In order to hold the die normally upward as in Fig. 5, I provide a leaf-spring 48, which at one end engages under a finger 49 struck from the sleeve 18, and the spring then extends through the hollow body to the lower portion thereof, and has its opposite end inserted into and held within an opening 50 in the lower face of the body (see Fig. 5).

It is thought that the operation of the seal will be apparent from the foregoing description, so it will not be described with particularity; and although the construction has been shown and described in detail, it is understood that it is not limited as to the precise form shown and described, except as may be by the terms of the appended claims.

The finger 49, in addition to holding the spring, travels in the space 51 between the halves of the body, and traveling in such space, which constitutes a slot, serves as a guide for the movable die in its movement and serves to assist the serrated surfaces in preventing the die from turning.

I claim:

1. In a hand seal, the combination of a body, a fixed die member carried by the body, a movable die member, a stem having a threaded connection with the movable die, a sleeve surrounding said stem and having a sliding fit in the body, a serrated surface on the lower end of the sleeve adapted to be forced into biting engagement with the top of the movable die by the threading of the stem into the die, whereby the die, stem and sleeve are joined together, and whereby the movable die may be turned into proper position to aline the characters thereon with the characters on the fixed die prior to securance of the movable die into position, and means for actuating the sleeve to carry the movable die toward and from the fixed die, substantially as described.

2. In a hand seal, the combination of a body, a fixed die carried by the body, a movable die, a headed stem having a threaded connection with the movable die, a sleeve surrounding said stem and having a sliding fit in the body, a serrated surface on the lower end of said sleeve adapted to be forced into biting engagement with the top of the movable die by the threading of the stem into said die, whereby the stem, die and sleeve are joined together, and whereby the movable die may be turned into proper position to aline the characters thereon with the characters on the fixed die prior to securance of the movable die in position, a lip outwardly extending from the sleeve, said body having a slot in which said lip travels, said lip guiding the movable die and associated parts in their up and down movement and assisting the serrated surface in preventing a turning movement of the movable die, and said lip so formed allowing a free turning movement of the stem within the sleeve to allow the stem to be brought into and retracted from threaded engagement with the die, and means for actuating the movable die and associated parts toward and from the fixed die, substantially as described.

3. In a hand seal, the combination of a hollow body, a fixed die carried by said body, a carrying plate on the body to which the fixed die is secured, said plate having a portion thereof depressed and having openings adjacent said depressed portion, ears struck up from the body, said ears extending through said openings and then bent over to lie in said depressed portions and forming a rigid interlocking connection between the body and plate, and a movable die carried by the body, substantially as described.

H. H. WENTHE.